United States Patent [19]

Amagasa

[11] Patent Number: 5,036,962
[45] Date of Patent: Aug. 6, 1991

[54] SHIFT LOCK SYSTEM FOR AN AUTOMATIC TRANSMISSION OF A MOTOR VEHICLE

[75] Inventor: Yoshinori Amagasa, Ohta, Japan

[73] Assignee: Fuji Jukogyo Kabushiki Kaisha, Tokyo, Japan

[21] Appl. No.: 451,417

[22] Filed: Dec. 15, 1989

[30] Foreign Application Priority Data

Dec. 27, 1988 [JP] Japan .............................. 63-170276[U]

[51] Int. Cl.$^5$ ........................ B60K 41/28; B60K 20/04
[52] U.S. Cl. ................................. 192/4 A; 74/483 R; 70/248; 180/271
[58] Field of Search ...................... 192/4 R, 4 A, 4 C; 70/248; 74/483 R; 180/271

[56] References Cited

U.S. PATENT DOCUMENTS

| | | | |
|---|---|---|---|
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,572,340 | 2/1986 | Pierce | 192/4 C |
| 4,671,085 | 6/1987 | Yamaguchi et al. | 70/248 |
| 4,880,092 | 11/1989 | Kito et al. | 192/4 A |
| 4,884,668 | 12/1989 | Kobayashi et al. | 192/4 A |
| 4,887,702 | 12/1989 | Ratke et al. | 192/4 A |
| 4,905,802 | 3/1990 | Gotoh | 192/4 A |
| 4,934,496 | 6/1990 | Barske et al. | 192/4 A |
| 4,947,967 | 8/1990 | Kito et al. | 192/4 A |

FOREIGN PATENT DOCUMENTS

| | | | |
|---|---|---|---|
| 1203756 | 4/1986 | Canada | 192/4 A |
| 315173 | 5/1989 | European Pat. Off. | 192/4 R |
| 315174 | 5/1989 | European Pat. Off. | 192/4 R |
| 63-5046 | 2/1988 | Japan . | |

Primary Examiner—Richard Lorence
Attorney, Agent, or Firm—Martin A. Farber

[57] ABSTRACT

A shift lever is provided for selecting operating ranges of an automatic transmission of a motor vehicle. A lock lever is provided for locking the shift lever at a parking range position of the transmission. The lock lever is urged by a spring to the parking range position. The lock lever is arranged to be moved to a release position when a brake pedal of the vehicle is depressed.

8 Claims, 5 Drawing Sheets

SHIFT LOCK SYSTEM FOR AN AUTOMATIC TRANSMISSION OF A MOTOR VEHICLE

BACKGROUND OF THE INVENTION

The present invention relates to a shift lock system for an automatic transmission of a motor vehicle, and more particularly to a system for preventing the motor vehicle from unexpectedly starting.

In order to prevent the motor vehicle from abruptly starting, a shift lock system is proposed. In the system, an ignition key can not be drawn from an ignition key cylinder in the parking condition of the vehicle, unless a shift lever of the automatic transmission is positioned at a parking (P) range position of the transmission by manipulating the shift lever. In order to select another range other than the P-range for starting the vehicle, a brake pedal must be depressed. Thus, abrupt starting of the vehicle is prevented.

However, the shift lever can be shifted to other positions than the parking position if a shift lever button provided on the shift lever for releasing the lock of the shift lever is depressed after the ignition key is drawn from the key cylinder. Therefore, it is possible to start the engine even if the shift lever is positioned other than in the parking position. This can cause an abrupt starting of the vehicle.

SUMMARY OF THE INVENTION

The object of the present invention is to provide a shift lock system which can reliably prevent a motor vehicle from abruptly starting.

According to the present invention, there is provided a shift lock system for an automatic transmission of a motor vehicle having a shift lever for selecting operating ranges of the transmission including a parking range, the system comprising a lock lever provided for locking the shift lever at a parking range position, a spring for keeping the lock lever at the parking range position, release means for moving the lock lever to a release position for releasing the shift lever condition when of a brake pedal of the vehicle is depressed.

The release means comprises a solenoid for moving the lock lever to a release position, a parking position switch provided to be closed at the parking range position, a brake switch provided to be closed at depression of the brake pedal, and an electric circuit including the parking position switch and the brake switch for energizing the solenoid to move the lock lever to the release position.

DETAILED DESCRIPTION OF THE PREFERRED EMBODIMENT

Figure 1:
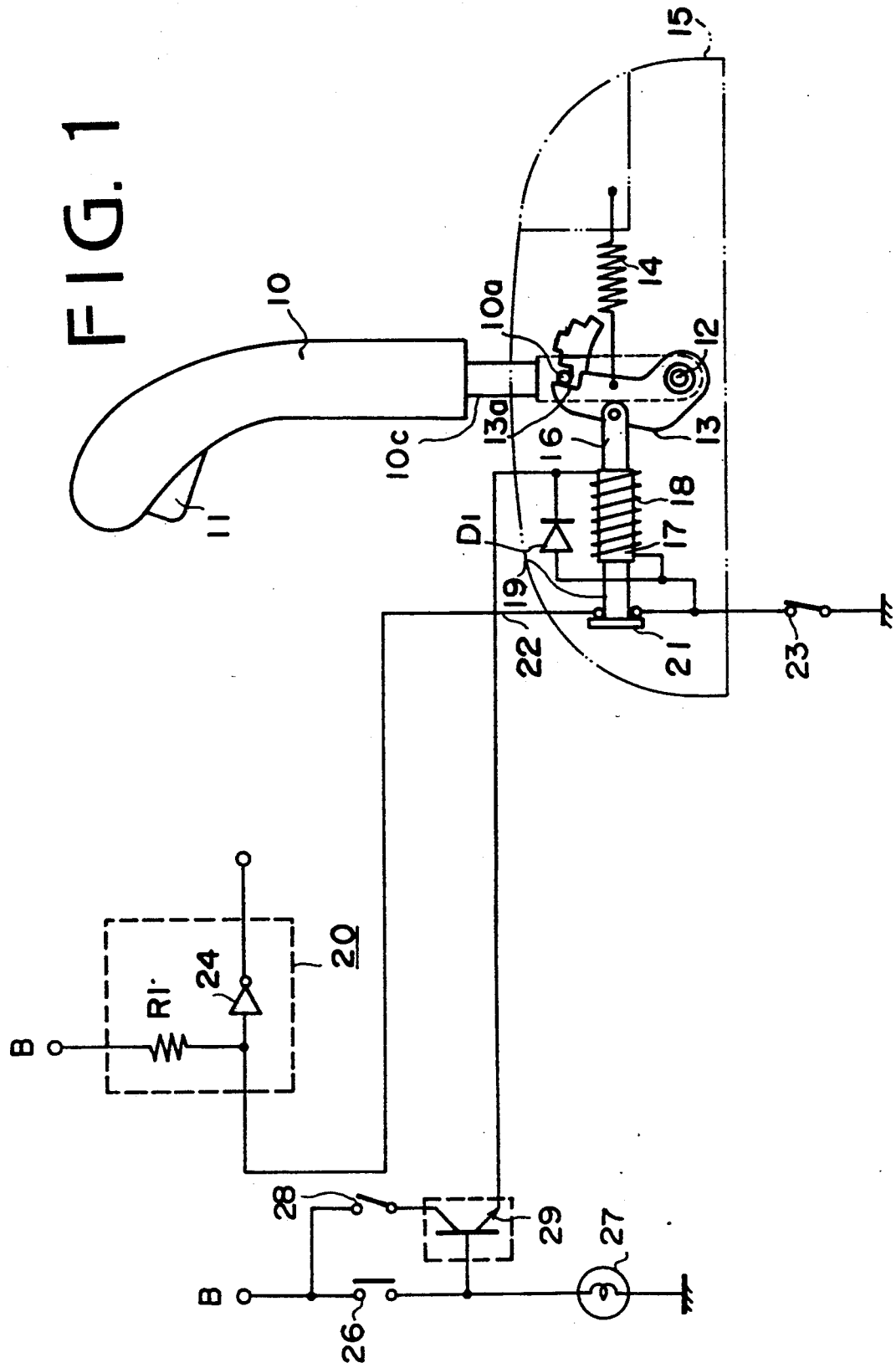
FIG. 1 is a schematic diagram showing a shift lock system for an automatic transmission according to the present invention.

Referring to FIG. 1, a shift lever 10 has a shift lever button 11 provided on a grip end portion of the shift lever 10 for releasing the lock of the shift lever when the shift lever is shifted. When the button 11 is pushed, the lock of the shift lever is released as described hereinafter. A hollow shaft 10c of the shift lever 10 is pivotally mounted in a console box 15 through a pivot 12 on which a lock lever 13 is pivotally mounted. The lock lever 13 has a notch 13a formed on the upper end portion thereof to be engaged with a pin 10a provided on the shaft 10c. An end of a spring 14 is connected to the lock lever 13 and the other end of the spring 14 is connected to a wall of the console box 15 to urge the notch 13a of the lock lever 13 to the pin 10a of the shift lever 10.

Figure 3:
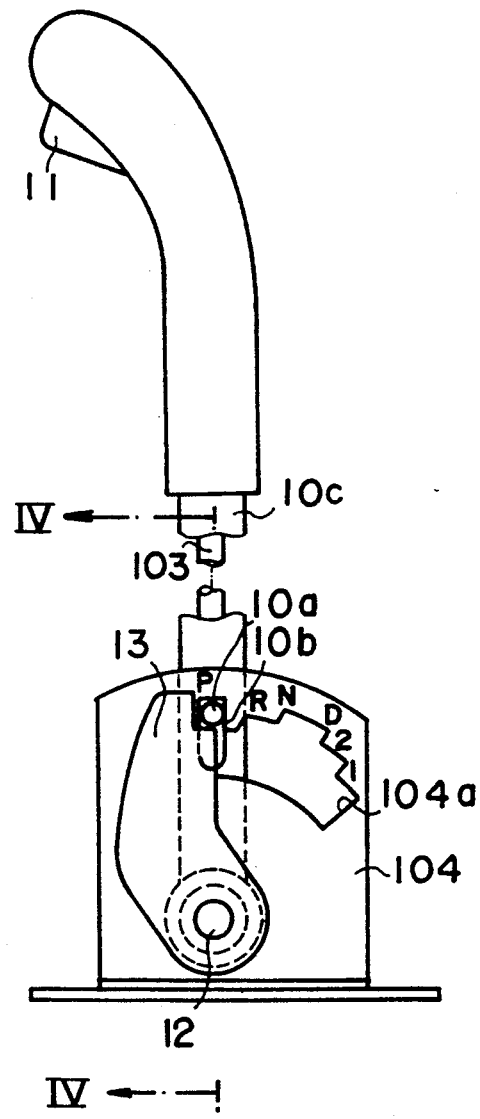
FIG. 3 is a side view showing a shift lever of the system.
Figure 4:
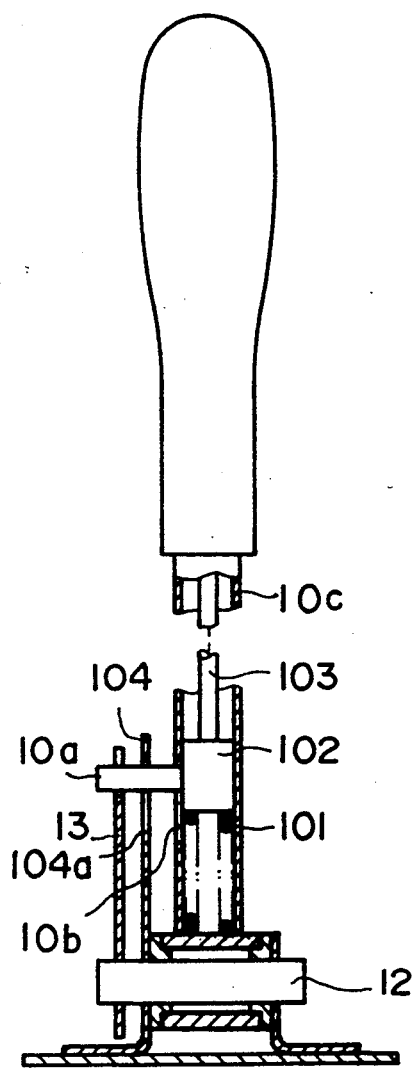
FIG. 4 is a sectional view of the shift lever taken along a line IV—IV of FIG. 3.

Referring to FIGS. 3 and 4, the shift lever button 11 is connected to a rod 103 extending in the shaft 10c. A plunger 102 is attached to the lower end of the rod 103 and slidably mounted in the shaft 10c. A return coil spring 101 is provided between the plunger 102 and the bottom of the shaft 10c. The pin 10a is fixed to the plunger 102 so as to project from an elongated hole 10b formed in the wall of shaft 10c and an opening 104a of a shift panel 104. The shift panel 104 is provided between the lock lever 13 and the shaft 10c and secured to the console box 15. When the button 11 is pushed, the rod 103 is downwardly moved to move the plunger 102 down against the elastic force of the spring 101. Thus, the pin 10a moves down along the hole 10b.

As shown in FIG. 3, the opening 104a of the shift panel 104 has a plurality of notches P, R, N, D, 2 and 1 formed on the upper periphery thereof representing operational ranges of the transmission such as P-range (parking), R-range (reverse), N-range (neutral), D-range (driving), 2-range (2nd hold) and 1-range (1st hold), respectively. The pin 10a is restricted between the notch P of the shift panel 104 and the notch 13a of the lock plate 13 so as not to be moved.

Figure 2A:
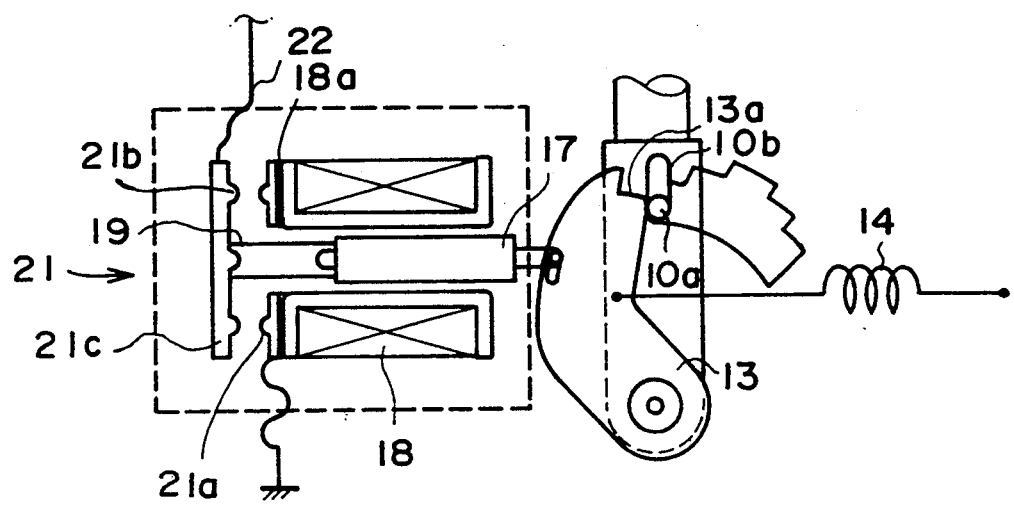
FIGS. 2a and 2b are enlarged views partly showing the shift lock system.

On the lock lever 13, a rod 16 having a core 17 is mounted opposite to the spring 14. A solenoid 18 is provided around the core 17. As shown in FIG. 2a, the end of the rod 16 is slidably mounted in a hole formed in the lock lever 13. Secured to the other end of the core 17 is an insulating rod 19 to which a switch plate 21c is attached. The solenoid 18 has fixed contacts 21a fixed to a side of the solenoid 18 through an insulator 18a. The switch plate 21c has movable contacts 21b corresponding to the fixed contacts 21a. Thus, a shift lock detecting switch 21 is provided for detecting the locking state of the shift lever 10.

Figure 2B:
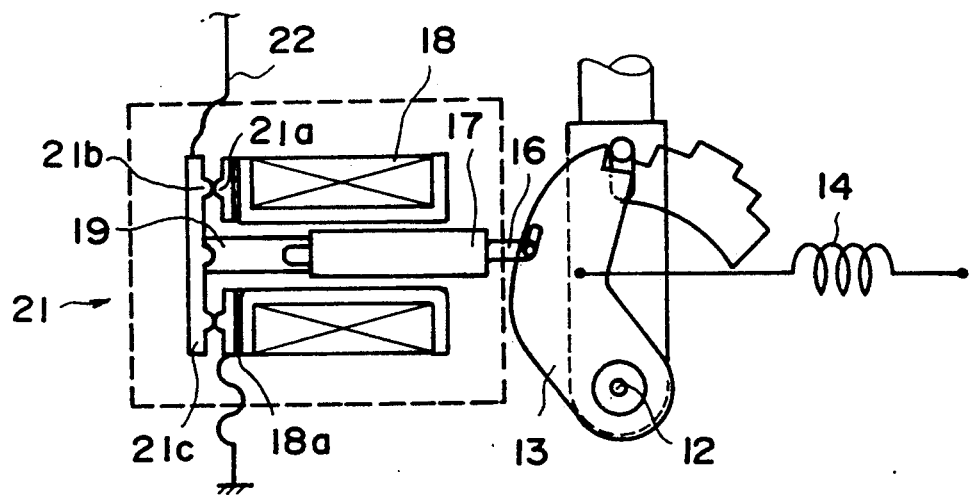

Referring back to FIGS. 1, 2a and 2b, the fixed contact 21a of the shift lock detecting switch 21 is connected to a P-range position detecting switch 23 which is connected to ground. The switch 23 is closed when the P-range is selected. The movable contact 21b of the switch 21 is connected to a source B through a line 22 and a resistor R1. The ground side of the resistor R1 is connected to a NOT gate 24. The resistor R1 and the NOT gate 24 comprise an ignition key interlocking control circuit 20.

Figure 5A:
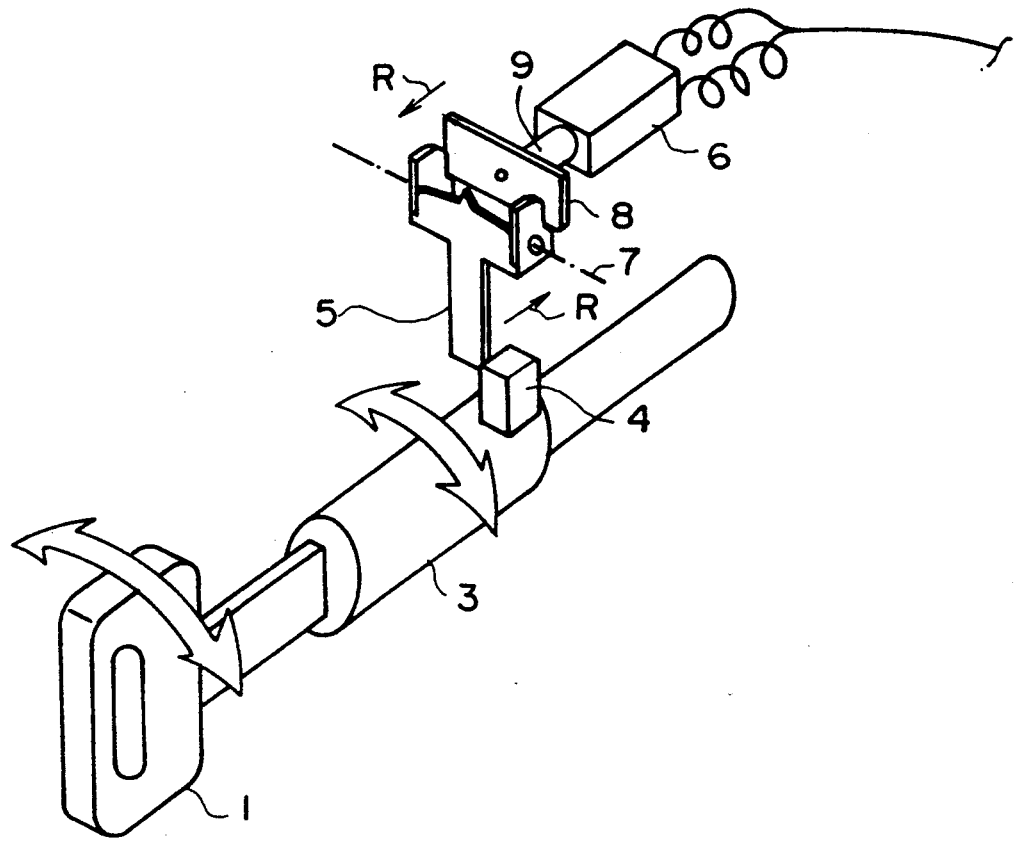
FIG. 5a is a perspective view of an ignition key interlocking device.
Figure 5B:
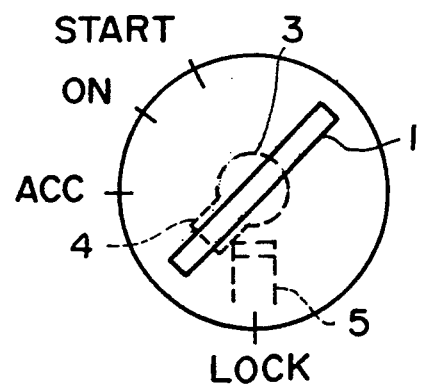
FIG. 5b an illustration showing operating positions of the ignition key.

Referring to FIG. 5a, an ignition key interlocking device has a solenoid 6 to which the output signal of the gate 24 is applied for energizing the solenoid 6. An interlocking lever 5 is pivotally mounted on a shaft 7 to be pivoted by an actuating plate 8 secured to a plunger 9 of the solenoid 6. A projection 4 is provided on a rotator 3 pivotally mounted in an ignition key cylinder (not shown) so as to engage with the interlocking lever 5 for preventing an ignition key 1 from pivoting to a steering lock position LOCK in FIG. 5b where a key 1 can be removed.

An end of the solenoid 18 is connected to the source B through a transistor 29 and an ignition switch 28. The other end of the solenoid 18 is connected to the ground through the switch 23. A diode D1 is provided between both ends of the solenoid 18. Further, the source B is connected to a brake switch 26 which is connected to a base of the transistor 29 and a brake lamp 27.

When the shift lever 10 is at the P-range position, the pin 10a is restricted between the notch P and the notch 13a, thereby preventing the shift lever from being shifted to positions other than the P-range position. At the P-range position, the contact 21b of the switch plate 21c contacts the contact 21a to close the shift lock detecting switch 21 and the P-range position detecting switch 23 closes. The current from the source B flows in the line 22 and switches 21 and 23. Thus, a low level signal is applied to the NOT gate 24 which produces an output signal. The output signal is applied to the solenoid 6 to move the actuating plate 8 in a direction R. The interlocking lever 5 pivots in the direction R with the actuating plate 8 so that the lever 5 is removed from the path of movement of the projection 4 to release the interlock of the ignition key 1. Thus, the key 1 can be removed from the key cylinder in the parking state, after the key is pivoted to the LOCK position.

At the next starting of the engine, when the ignition switch 28 is turned on at the P-range position of the shift lever 10 and the brake pedal is depressed to close the brake switch 26, the transistor 29 is turned on, so that the solenoid 18 is energized.

Accordingly, the core 17 is moved to the left as shown FIG. 2a. Thus, the switch plate 21c is moved to the left to disengage the contacts 21b from the fixed contacts 21a. Consequently, the lock lever 13 is pivoted to the left against the elastic force of the spring 14, so that the notch 13a of the lock lever 13 is disengaged from the pin 10a in the notch P of the panel 104.

If the shift lever 10 is in a range other than the P-range, the P-range position detecting switch 21 is opened. Accordingly, a high level signal is applied to the NOT gate 24, so that no signal is applied to the solenoid 6. Thus, the interlock lever 5 is at the lock position shown in FIG. 5a. Consequently, the ignition key 1 can not be rotated to the LOCK position. When the shift lever 10 is shifted to the P-range position, the switch 23 closes and the low level signal is applied to the NOT gate 24 which produces the signal to the solenoid 6. The plunger 9 is projected to remove the interlock lever 5 from the projection 4. Thus, the key 1 can be removed at the LOCK position.

In accordance with the present invention, the shift lever is locked at the P-range position in the parking state, thereby preventing the shift lever from being shifted to another position through the P-range position Thus, abrupt starting of the motor vehicle is prevented.

While the presently preferred embodiment of the present invention has been shown and described, it is to be understood that various changes and modifications may be made without departing from the scope of the invention as set forth in the appended claims.

What is claimed is:

1. A shift lock system for an automatic transmission of a motor vehicle having a shift lever for selecting operating ranges of the transmission including a parking range, comprising:
    a lock lever provided for locking the shift lever at a parking range position;
    a spring for urging the lock lever to a position in which it prevents the shift lever from being moved from the parking range position;
    release means for moving the lock lever to a release position for releasing the shift lever under the condition of depression of a brake pedal of the vehicle; and wherein
    the release means comprises a solenoid for moving the lock lever too a release position, a parking position switch provided to be closed at the parking range position, a brake switch provided to be closed at the depression of the brake pedal, and an electric circuit including the parking position switch and the brake switch for energizing the solenoid to move the lock lever to the release position.

2. A shift lock system for an automatic transmission of a motor vehicle having a shift lever operative for selecting operating ranges of the transmission including at least a parking range and a drive range, a panel having an opening at least with a parking notch corresponding to the parking range and a driven notch corresponding to the drive range, a pin selectively engaged with one of the notches, a push button provided on the shift lever and operatively connected to the pin to push the pin to a downward position for removing the pin from the parking notch, and a brake switch to be closed at a condition of depression of a brake pedal of the vehicle, the system comprising:
    lock means, pivotally swingable to a release position by the pin when the pin moves the drive notch to the downward position inn accordance with operative of the shift lever, for restricting movement of the pin at the parking notch to prevent the pin from being moved from the parking notch;
    solenoid means responsive to a closed condition of the brake switch for moving the lock means to the release position inn order to enable the pin to release from the parking notch;
    a shift lock detecting switch operatively connected to the lock means to be opened when the lock means moves to the release position;
    a parking range position switch to be closed when the shift lever is positioned in the parking range;
    control means connected to the shift lock detecting switch and the parking range position switch in series for producing a first signal when either of said switches is opened and a second signal when both of said switches are closed, respectively; and
    interlocking means for interlocking an ignition key to prevent the ignition key from turning in response to said first signal and for releasing the ignition key to enable the ignition key to turn in response to the second signal, respectively.

3. The system according to claim 2, wherein
    said lock means comprises a lock lever pivotally mounted with the shift lever and a spring urging the lock lever in a direction opposite to the release position, so as to lock the pin at the parking notch.

4. The system according to claim 3, wherein
    said lock lever has a notch to receive the pin when the pin is positioned at the parking notch.

5. The system according to claim 3, wherein
said solenoid means comprises a solenoid connected across an electric source and ground through the brake switch and a rod slidably mounted inside the solenoid and connected to the lock lever at one end thereof.

6. The system according to claim 2, wherein
said control means comprises a resistor disposed between an electric source and the shift lock detecting switch in series and a NOT gate connected to the resistor and the shift lock detecting switch.

7. The system according to claim 2, wherein
the interlocking means comprises a rotator for receiving the ignition key to be rotated with operation of the ignition key, a projection on the rotator, an interlocking lever pivotally mounted between a first position in a path of movement of the projection and a second position removed from the path of movement of the projection, and actuating means responsive to either of said first and second signals from the control means for actuating the interlocking lever to move the interlocking lever to either of said first and second positions, respectively.

8. The system according to claim 7, wherein
the actuating means comprises an actuating plate engaged with the interlocking lever and a solenoid for operating the actuating plate so as to move the interlocking lever in one of the first and second positions in response to one of the first and second signals, respectively.

* * * * *